United States Patent
Banno et al.

(10) Patent No.: US 6,471,013 B2
(45) Date of Patent: Oct. 29, 2002

(54) APPARATUS FOR CONTROLLING CHARGING AND DISCHARGING OF SUPPLEMENTAL POWER SUPPLY OF AN ELEVATOR SYSTEM

(75) Inventors: Hirokazu Banno, Tokyo (JP); Shinobu Tajima, Tokyo (JP); Hiroshi Araki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/842,400

(22) Filed: Apr. 26, 2001

(65) Prior Publication Data

US 2002/0053490 A1 May 9, 2002

(30) Foreign Application Priority Data

Nov. 9, 2000 (JP) ........................................ 2000-342082

(51) Int. Cl.⁷ .................................................. B66B 1/06
(52) U.S. Cl. ........................................ 187/290; 187/296
(58) Field of Search ................................. 187/290, 296, 187/297; 318/375, 376; 320/128, 132, 134, 135, 136, 143, 144

(56) References Cited

U.S. PATENT DOCUMENTS

| | | | | |
|---|---|---|---|---|
| 4,456,097 A | * | 6/1984 | Salihi ........................ | 187/289 |
| 4,554,500 A | * | 11/1985 | Sokira ........................ | 320/31 |
| 4,554,999 A | * | 11/1985 | Kamaike ..................... | 187/290 |
| 4,849,682 A | * | 7/1989 | Bauer et al. ................. | 320/15 |
| 5,285,029 A | * | 2/1994 | Araki ......................... | 187/290 |
| 5,896,948 A | * | 4/1999 | Suur-Askola et al. ....... | 187/290 |
| 6,002,220 A | * | 12/1999 | Takahashi et al. .......... | 318/139 |
| 6,121,740 A | * | 9/2000 | Gale et al. .................. | 318/362 |
| 6,315,081 B1 | * | 11/2001 | Yeo ............................ | 187/290 |

FOREIGN PATENT DOCUMENTS

JP 59-203072 11/1984

OTHER PUBLICATIONS

U.S. patent application Ser. No. 09/774,024, Tominaga et al., filed Jan. 2001.
U.S. patent application Ser. No. 09/780,391, Araki et al., filed Feb. 2001.
U.S. patent application Ser. No. 09/785,233, Tajima et al., filed Feb. 2001.

* cited by examiner

*Primary Examiner*—Jonathan Salata
(74) *Attorney, Agent, or Firm*—Leydig, Voit & Mayer, Ltd.

(57) ABSTRACT

An apparatus for controlling an elevator which has a high energy-saving effect based on charging while using a low-capacity and low-priced secondary battery. The apparatus has a converter for converting an alternating current from an ac power supply into a dc power by rectifying the alternating current, an inverter for driving an electric motor by converting the dc power from the converter into variable-voltage variable-frequency ac power, the motor being driven for the operation of the elevator, and a power accumulator connected to a dc bus between the converter and the inverter. The power accumulator accumulates dc power from the dc bus during regenerative operation of the elevator, and supplies the accumulated dc power to the dc bus during power-drive operation of the elevator. The apparatus also has charge/discharge control circuit for controlling charging/discharging of the power accumulator from or to the direct current bus, and a measuring device for measuring at least one of the temperature, current and voltage of the power accumulator. The charge/discharge control circuit adjusts the maximum value of the current for charging/discharging of the power accumulator according to an output from the measuring device.

8 Claims, 8 Drawing Sheets

APPARATUS FOR CONTROLLING CHARGING AND DISCHARGING OF SUPPLEMENTAL POWER SUPPLY OF AN ELEVATOR SYSTEM

CROSS REFERENCE TO RELATED APPLICATION

This application is based on Application No. 2000-342082 filed in Japan on Nov. 9, 2000, the contents of which are hereby incorporated by reference.

BACKGROUND OF THE INVENTION

1. Field of the Invention

The present invention relates to an energy-saving type of elevator controller to which a secondary battery is applied.

2. Description of the Related Art

Figure 7:
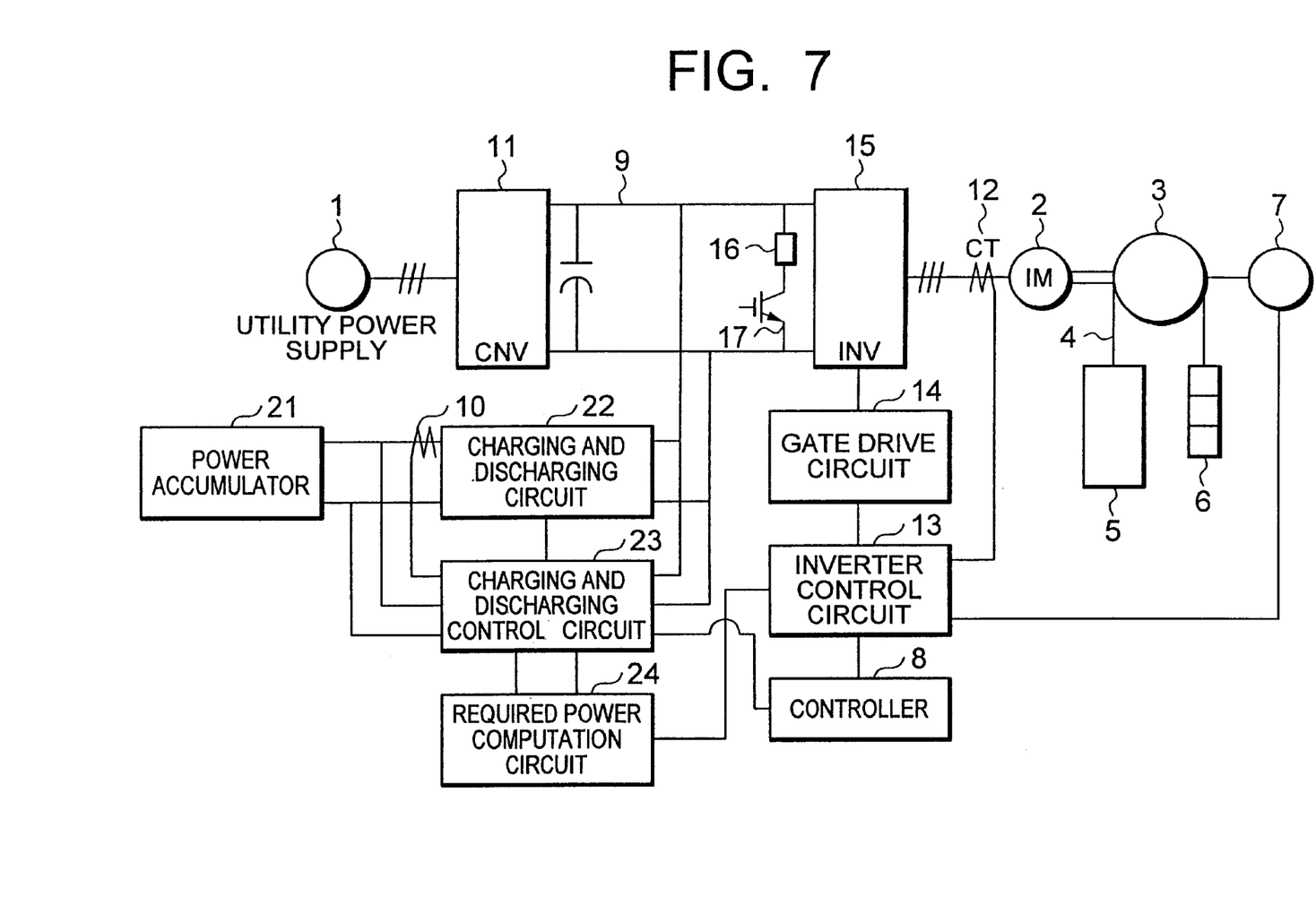
FIG. 7 is a diagram showing the system configuration of a conventional elevator controller.

FIG. 7 is a diagram showing the system configuration of a conventional elevator controller.

The elevator controller shown in FIG. 7 uses an ordinary utility power supply 1 for supplying a three-phase alternating current or the like, and an electric motor 2, such as an induction motor. The electric motor 2 rotates to drive a hoist machine 3, which moves, along a vertical direction, a car 5 and a counterweight 6 connected to two ends of a rope 4 to transport passengers in the car to a designated floor.

AC power supplied from the utility power supply 1 is rectified by a converter (CNV) 11 constituted of diodes, or the like, and converted into dc power. The dc power is supplied to a dc bus 9. The dc power is converted into variable-voltage variable-frequency ac power by an inverter (INV) 15 constituted of ordinary transistors, insulated gate bipolar transistors (IGBTs), or the like.

A controller 8 constituted of a microcomputer, or the like, controls the entire elevator system. The controller 8 prepares elevator start and stop commands and elevator position and speed commands. An inverter control circuit 13 drives and rotates the electric motor 2 on the basis of information on current feedback from a current sensor 12 and speed feedback from a speed sensor 7 mounted on the hoist machine 3 and constituted of an encoder, or the like, and on the basis of commands from the controller 8, thereby achieving position and speed control of the elevator. For this control, the inverter control circuit 13 controls the output voltage and output frequency of the inverter 15 through a gate drive circuit 14.

The counterweight 6 of the elevator is set to a weight such as to be balanced with the car 5 with a moderate load (ordinarily half the rated load). Ordinarily, therefore, the operation is in a power-drive mode in which electric power is consumed when the car moves downward without a load, and in a regenerative mode in which kinetic energy is converted into electric power when the car moves upward without a load. Conversely, the operation is in the regenerative mode when the car moves downward with the rated load, and in the power-drive mode when the car moves upward with the rated load. In ordinary elevators, electric power regenerated in the regenerative mode is consumed by being converted into thermal energy in a regeneration resistor 16 controlled by a regeneration resistance control circuit 17.

Ordinarily, an energy-saving type of elevator to which a secondary battery is applied has a power accumulator 21 using a lead-acid battery or a nickel metal hydride battery as a secondary battery, a charging and discharging circuit 22 constituted of a DC-DC converter, etc., a charging and discharging control circuit 23 for controlling electric power charged or discharged by the charging and discharging circuit 22, and a required-power computation circuit 24 for computing necessary power for the elevator and controlling the charging and discharging control circuit 23 so that the power accumulator 21 is discharged to supply a deficiency in the necessary power not fully supplied from the utility power supply 1.

In general, for the purpose limiting the size and price of the controller, the number of cell units of the secondary battery is set to a small number, so that the output voltage of the batteries is lower than the voltage of the dc bus 9. The voltage of the dc bus 9 is ordinarily controlled so as to be maintained generally at a voltage obtained by the converter 11 rectifying the current from the utility power supply 1. Therefore, it is necessary to increase the busside output voltage of the charging and discharging circuit 22 to the bus voltage during discharging of the battery, and to reduce the bus-side input voltage of the charging and discharging circuit 22 below the converter output voltage during charging of the battery. For this reason, a DC-DC converter is used as charging and discharging circuit 22. Discharging gate and charging gate control of this DC-DC converter is performed by the charging and discharging control circuit 23.

Figure 8:
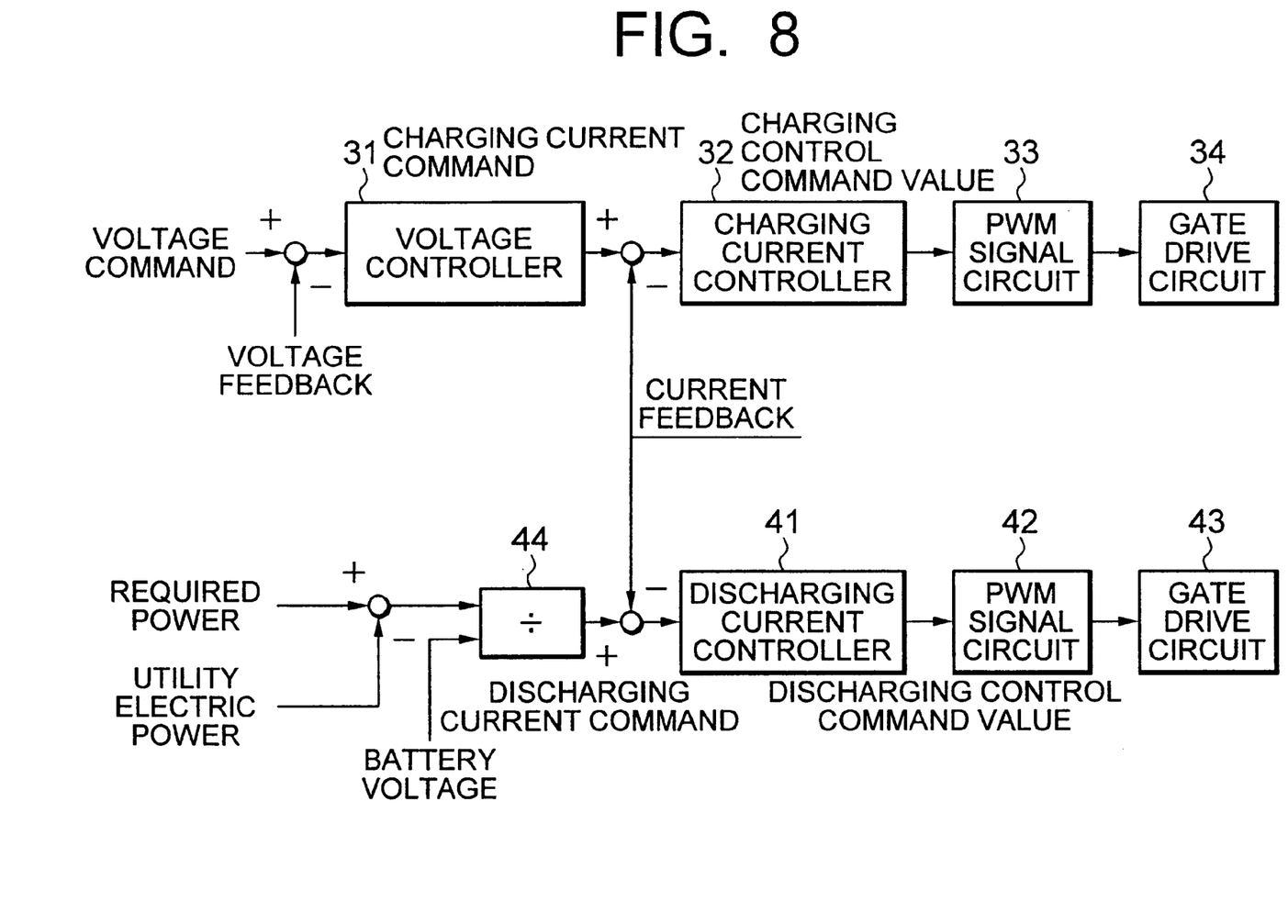
FIG. 8 is a block diagram of a charging and discharging control circuit in the conventional elevator controller shown in FIG. 7.

FIG. 8 is a block diagram showing an example of the above-described charging and discharging control circuit 23.

The charging and discharging control circuit 23 shown in FIG. 8 has a charging power control circuit comprised of a voltage controller 31, a charging current controller 32, a pulse-width modulation (PWM) signal circuit 33, and a gate drive circuit 34, and a discharging power control circuit comprised of a discharging current controller 41, a PWM signal circuit 42, a gate drive circuit 43, and a divider 44.

In the charging power control circuit, the voltage controller 31 computes, by proportional integration, for example, a deviation of a voltage feedback signal of the dc bus 9 from a voltage command from the controller shown in FIG. 7, and outputs the deviation as a charging current command value. The charging current controller 32 computes, by proportional integration, for example, a deviation of a current feedback signal from the current sensor 10 provided between the power accumulator 21 and the charging and discharging circuit 22 shown in FIG. 7 from the charging current command from the voltage controller 31, and outputs the deviation as a charging control command value. The PWM signal circuit 33 forms a control signal for PWM control of the charging and discharging circuit 22 comprised of a DC-DC converter on the basis of the charging control command value from the charging current controller 32, and outputs the control signal. The gate drive circuit 34 controls the charging gate of the charging and discharging circuit 22 on the basis of the control signal from the PWM signal circuit 33.

When electric power is regenerated from the electric motor 2, the voltage of the dc bus 9 is increased by the regenerated electric power. When the voltage of the dc bus 9 becomes higher than the output voltage from the converter 11, power supply from the utility power supply 1 is stopped. When the voltage of the dc bus 9 is further increased to reach a predetermined voltage, the polarity of the charging current command value from the voltage controller 31 is inverted and the power accumulator 21 is charged with the regenerated power under the control of the charging and discharging control circuit 23.

On the other hand, in the discharging power control circuit, the divider 44 outputs, from the output of the required power computation circuit 24, which computes the necessary power for the elevator, a discharging current command value so that the power accumulator 21 discharges and supplies the necessary power not fully supplied from the utility power supply 1. That is, this discharging current command value is obtained by dividing a power deviation value by the battery voltage of power accumulator 21. The power deviation value can be obtained from the utility power corresponding to the command value from the controller 8 designating the maximum supply of the utility power supply and the output power from the required power computation circuit 23. The discharging current controller 41 computes, by proportional integration, for example, the difference between the discharging current command value and the current feedback signal from the current sensor 10, which is connected between the power accumulator 21 and the charging and discharging circuit 22, as shown in FIG. 7. The discharging current controller 41 outputs the difference as a discharging control command value. The PWM signal circuit 42 generates a control signal for PWM control of the charging and discharging circuit 22, including a DC-DC converter, based on the discharging control command signal from the discharging current controller 41, and outputs the control signal. The gate drive circuit 43 controls the discharging gate and the charging and discharging circuit 22 based on the control signal from the PWM signal circuit 42.

During power-drive operation, the elevator requires supply of electric power and is supplied with the necessary power from discharge of the power accumulator 21 and from the utility power supply 1. The divider 44 outputs, from the output from the required power computation circuit 24 that computes the necessary power for the elevator, the discharging current command value to discharge the power accumulator 21 to supply a deficiency in the necessary power not fully supplied from the utility power supply 1. Thus, electric power is discharged from the power accumulator 21 under the control of the charging and discharging control circuit 23, and the bus voltage settles down at a suitable level, thereby supplying the elevator with the necessary electric power.

As described above, regenerated electric power is accumulated in the power accumulator 21 to enable reuse of original power, thus achieving an energy-saving effect.

In the above-described conventional elevator controller, there is a need to incorporate, as power accumulator 21, a high-priced large-capacity power accumulator capable of being charged by regenerated power under all possible conditions with respect to the temperature and the amount of charge (state of charge: SOC) of the power accumulator, etc. Also for the purpose of ensuring a sufficient amount of discharge under such conditions, a high-priced large power accumulator is needed.

SUMMARY OF THE INVENTION

In view of the above-described problem of the conventional art, an object of the present invention is to provide an elevator controller arranged to maintain an energy-saving effect based on charging and to achieve a high energy-saving effect while using a low-capacity and low-priced secondary battery.

According to one aspect of the present invention, there is provided an apparatus for controlling an elevator, comprising: a converter for converting an alternating current from an alternating current power supply into a direct current power by rectifying the alternating current; an inverter for driving an electric motor by converting the direct current power from the converter into variable-voltage variable-frequency alternating current power, the electric motor being driven for the operation of an elevator; a power accumulator connected to a direct current bus between the converter and the inverter, the power accumulator being capable of accumulating direct current power from the direct current bus during regenerative operation of the elevator, and also capable of supplying the accumulated direct current power to the direct current bus during power-drive operation of the elevator; charge/discharge control means for controlling each of charging and discharging of the power accumulator from or to the direct current bus; and measuring means for measuring at least one of temperature, current and voltage of the power accumulator, wherein the charge/discharge control means adjusts the maximum value of the current for each of charging and discharging of the power accumulator according to an output from the measuring means.

In a preferred form of the invention, the output from the measuring means is a function of at least one of current, voltage and temperature of the power accumulator during charging and discharging.

In another preferred form of the invention, the state of charge stored in the power accumulator is grasped from the output from the measuring means before the power accumulator is overcharged or overdischarged to adjust charging and discharging.

In a further preferred form of the invention, the charged amount of one of a fully-charged state and a completely-discharged state of the power accumulator is grasped from at least one of the outputs from the measuring means.

In a still further preferred form of the invention, the charge/discharge control means includes, as means for adjusting the maximum value of the current for each of charging and discharging, a current value limit circuit for limiting a charging/discharging current command value to a certain charging/discharging current limit value according to the output from the measuring means.

In a yet still further preferred form of the invention, the current value limit circuit multiplies the charging/discharging current command value by a constant such that the maximum value of the charging/discharging current to or from the power accumulator supposed from the elevator operation is limited to the charging/discharging current limit value.

In a furthermore preferred form of the invention, the current value limit circuit limits the charging/discharging current command value to the charging/discharging current limit value when the charging/discharging current command value exceeds the current limit value.

In a still further preferred form of the invention, the current value limit circuit sets the charging/discharging current limit value to a value obtained as the product of a constant and one of a battery specification value and a battery rated value of the power accumulator.

The above and other objects, features and advantages of the present invention will be more readily apparent to those skilled in the art from the following detailed description of preferred embodiments of the invention taken in conjunction with the accompanying drawings.

DESCRIPTION OF THE PREFERRED EMBODIMENTS

The present invention provides an elevator controller in which conditions of a power accumulator are measured and each of charging and discharging of regenerated power is controlled on the basis of data obtained by the measurement, and which enables charging and discharging control with extension of the battery life in this manner.

That is, according to the present invention, to ensure an energy-saving effect, charging and discharging are controlled so that the power accumulator accepts regenerated power as much as possible at the time of charging, and discharges a possible amount of power at the time of discharging. However, for the purpose of maintaining the desired charging performance and life of the battery, the power accumulator is prevented from being excessively charged and from being excessively discharged.

The present invention will be described with respect to preferred embodiments thereof.

Embodiment 1

Different kinds of secondary batteries, each of which may be used as a power accumulator, i.e., a lead-acid battery, a nickel metal hydride battery, or the like, vary in characteristics. In the case of an ordinary nickel metal hydride battery, the ability to accept charge is reduced in the condition that the temperature is higher compared with the usual case. In addition, the ability to accept charge is reduced as the amount of stored charge becomes closer to the maximum corresponding to the fully-charged state. If a large current is caused to flow through the battery in such a low-charge-acceptance condition, the internal resistance is increased, that is, heat is developed in the battery and the charging voltage is increased. Moreover, the charging performance and the battery life are thereby reduced. Therefore, it is necessary to control charging such that the possibility of occurrence and the extent of overcharging are minimized.

Also, with respect to discharging, an abrupt voltage drop is caused when the amount of stored charge becomes closer to the minimum corresponding to the completely-discharged state. If the discharging current is larger, the voltage drop is sharper. If discharging is continued after such a voltage drop, the battery is overdischarged (the charged voltage becomes lower than the discharge end voltage determined with respect to the battery). If a set of a plurality of batteries is overdischarged, reverse charging can occur (a charged state with reverse polarity) and there is a possibility of generation of a gas and leakage of a solution from the battery. Therefore, it is necessary to control discharging such that the possibility of occurrence and the extent of overdischarging are minimized.

Figure 1:
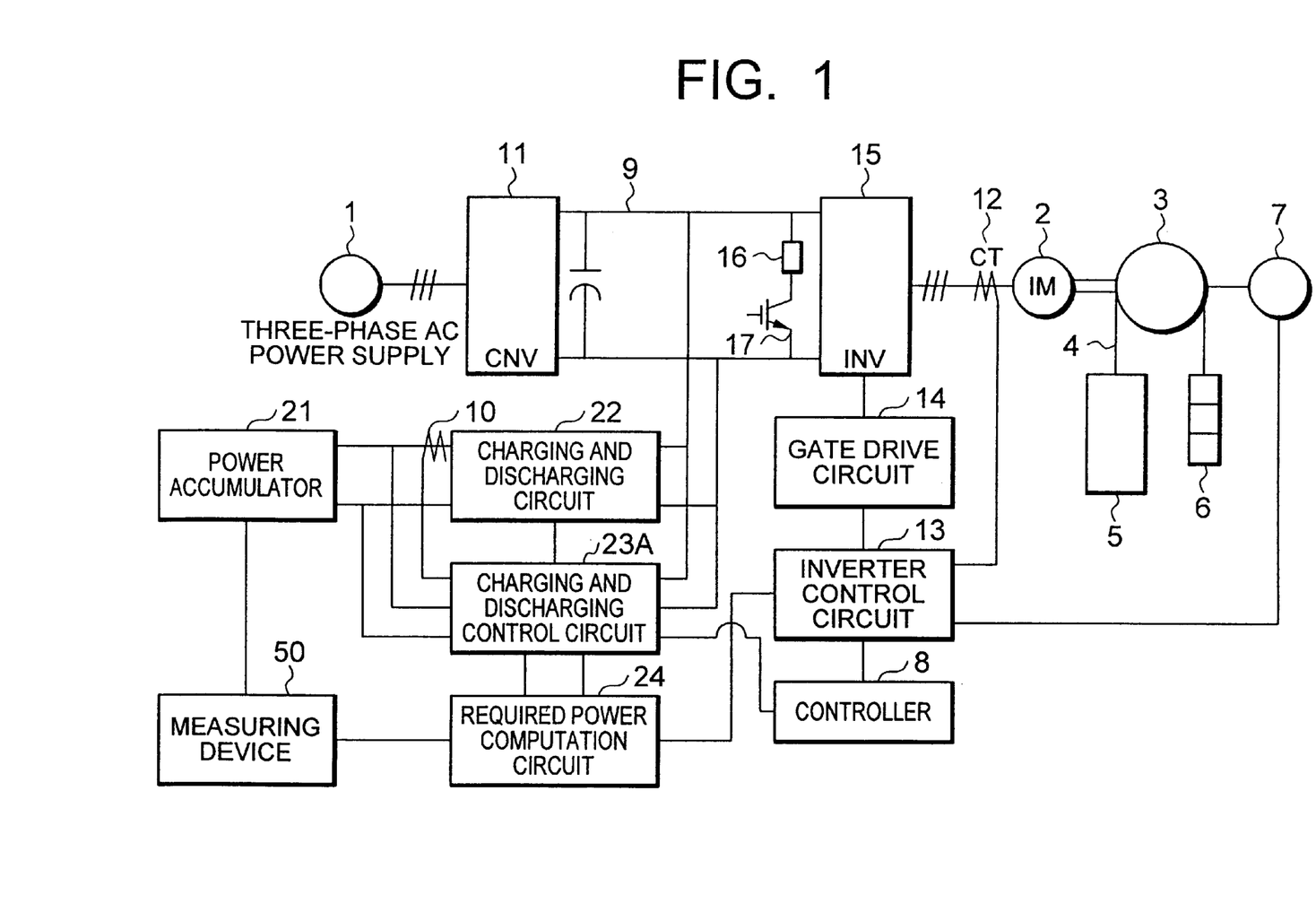
FIG. 1 is a diagram showing the system configuration of an elevator controller which represents a first embodiment of the present invention.

FIG. 1 is a diagram showing the system configuration of an elevator controller which represents Embodiment 1 of the present invention.

Figure 2:
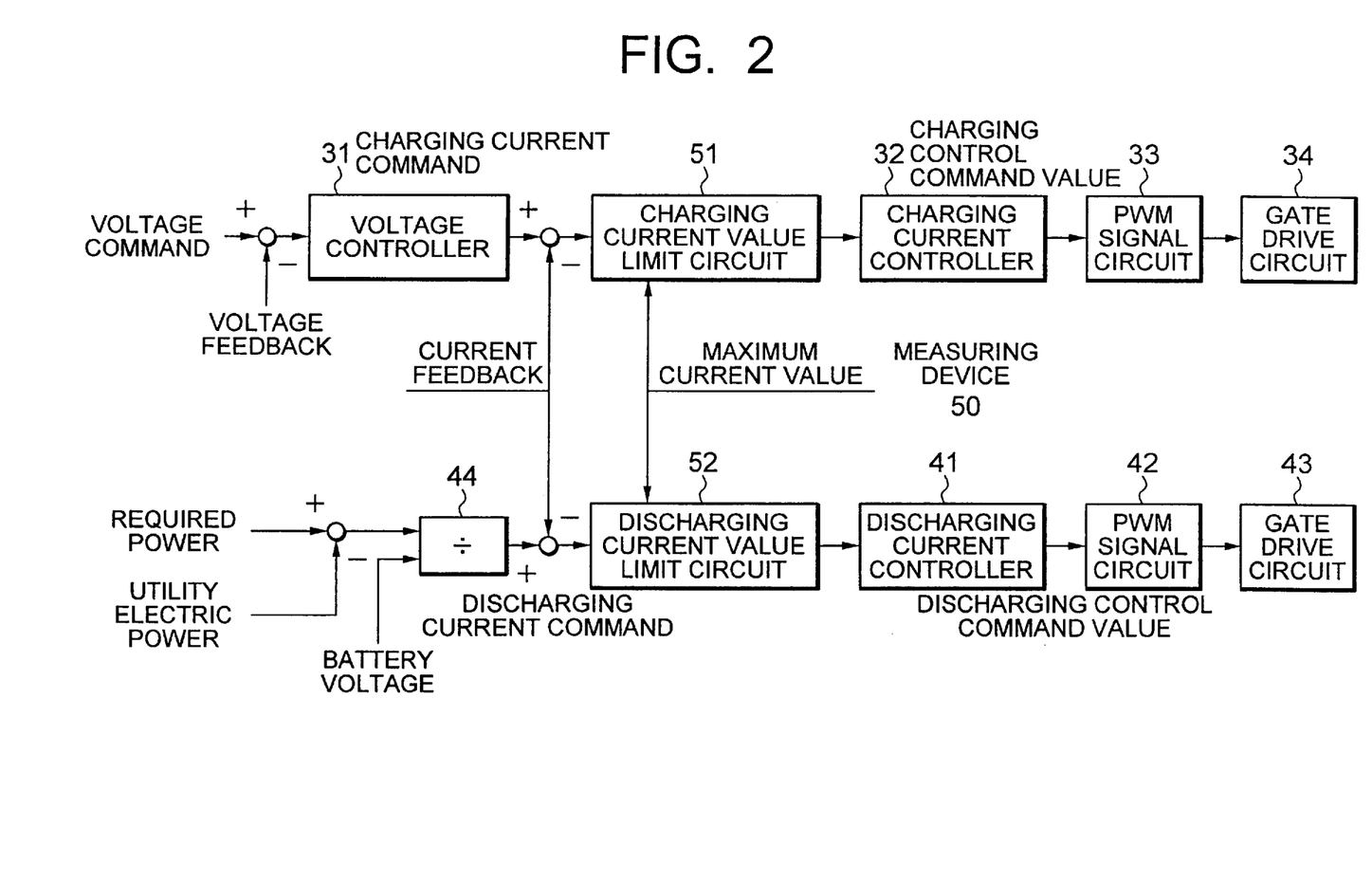
FIG. 2 is a block diagram showing the internal configuration of a charging and discharging control circuit shown in FIG. 1.

In FIG. 1, components corresponding to those in the conventional system shown in FIG. 7 are indicated by the same reference characters. The description for the corresponding components will not be repeated. Referring to FIG. 1, a component newly added is a measuring device 50 for measuring the charging/discharging current, the charging/discharging voltage, and the temperature of the power accumulator 21, or the like. Referring to FIG. 2, the charging and discharging control circuit 23A of Embodiment 1 has a charging current value limit circuit 51 and a discharging current value limit circuit 52 added to the circuits blocks corresponding to those in the charging and discharging control circuit 23 of the conventional system shown in FIG. 8. The charging current value limit circuit 51 and the discharging current value limit circuit 52 enable adjustment of charging and discharging current maximum command values.

The secondary battery used as the power accumulator 21 will first be described.

Different kinds of secondary batteries, each of which may be used as the power accumulator 21, i.e., a lead-acid battery, a nickel metal hydride battery, or the like, vary in characteristics. However, a method of grasping the amount of charge stored in an ordinary nickel metal hydride battery will be described with respect to this embodiment.

With respect to the capacity of a battery, a temperature, a discharging current, and a discharging end voltage are determined as values specific to the battery, each of which is ordinarily known through a current value. The amount of electricity that can be taken out from the battery in a fully-charged state is the rated capacity of the battery. Therefore, the amount of charge stored in the battery can be grasped substantially correctly by measuring the current flowing through the battery and obtaining the integral of the current.

The reason for determination of the temperature and the discharging current specific to the battery with respect to the battery capacity is because the charge acceptance is low when the temperature of the battery is higher than the specified temperature, and because the efficiency of discharging is lower when the temperature is lower than the specified temperature, and is also reduced if the charging/discharging current of the battery is increased. Because of variations in efficiency relating to the temperature and the current, it is difficult to grasp the amount of stored charge always accurately.

On the other hand, the fully-charged state and the completely-discharged state of the battery can be ordinarily grasped from factors other than the current. The detecting method will be described below.

When the state of storage in the battery is brought close to a discharge end during discharging, the voltage decreases abruptly. The voltage and the rate at which the voltage drops vary largely with respect to the discharging current value. However, to prevent overdischarging and reverse charging, discharging is ordinarily stopped when the battery voltage becomes equal to a certain voltage value. This voltage value is referred to as a discharge end voltage. From the relationship among the discharge end voltage, the battery temperature and the current value, the amount of charge stored in the battery can be determined. Thus, the amount of charge stored in the battery at the discharge end or the completely-discharged state can be grasped from the temperature, the current value and the voltage value of the battery.

When the state of the battery is brought close to the fully-charged state by charging, the temperature rises abruptly. The level of this rise depends on the charging current. The rising voltage then has a peak and starts decreasing. Therefore, the fully-charged state can be grasped from the current value, the amount of changed temperature and the amount of changed voltage.

As described above, the amount of stored charge can be grasped from battery parameters to enable efficient use of the battery as well as to prevent overcharging and overdischarging of the battery.

Based on the above-described knowledge, the role of the system will now be described.

Figure 3:
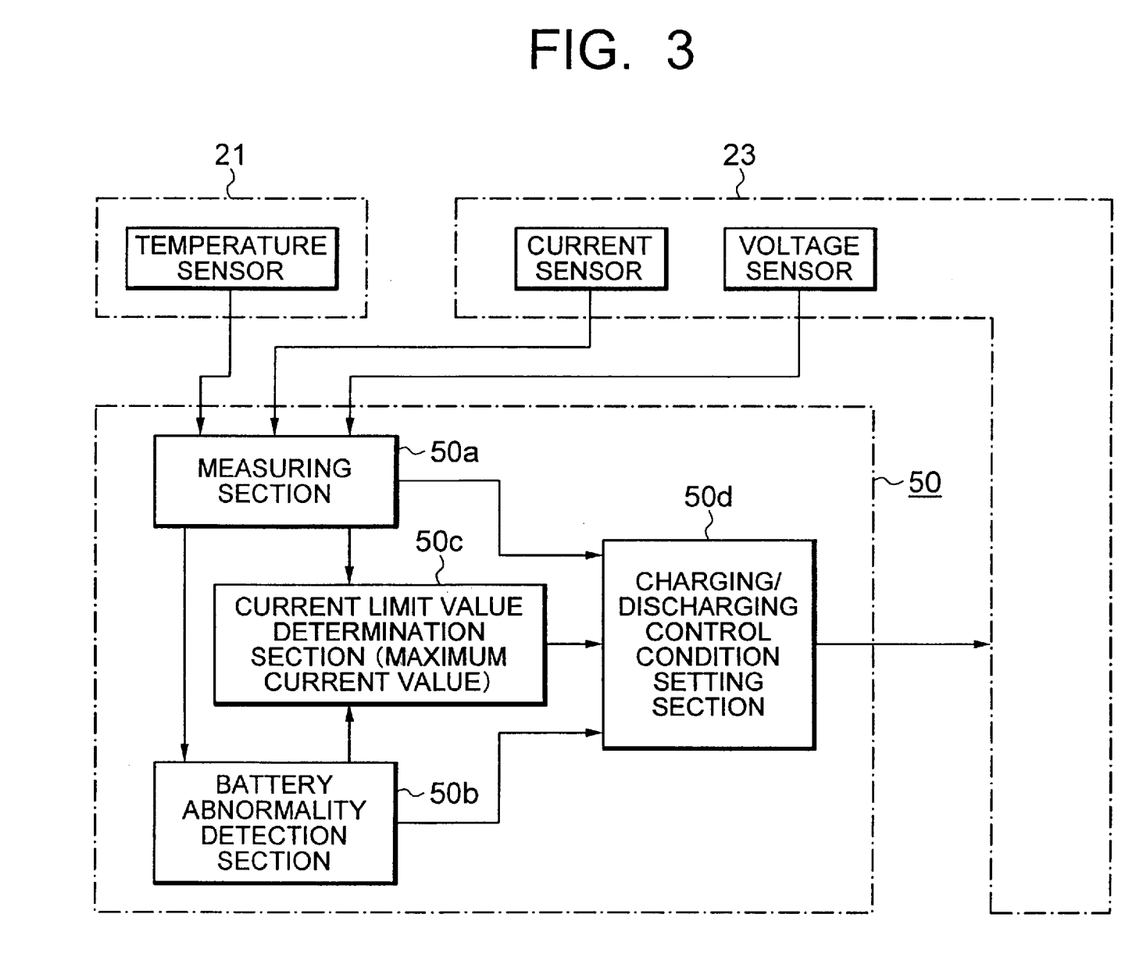
FIG. 3 is a block diagram showing the internal configuration of a measuring device shown in FIG. 1.

FIG. 3 shows the configuration of the measuring device 50 shown in FIG. 1.

That is, the measuring device 50 has a measuring section 50a for obtaining measured values relating to the battery (power accumulator 21) and for computing values from the measured values, a battery abnormality detection section 50b for detecting an abnormality of the battery from the measured values and for making a determination as to whether charging or discharging of the battery should be stopped, a current limit value determination section 50c for grasping the amount of charge stored in the battery from the measured and computed values and for determining the maximum value of a charging/discharging control current from the battery, and a charging/discharging control condition setting section 50d for setting charging/discharging control conditions for the charging and discharging control circuit 23.

Figure 4:
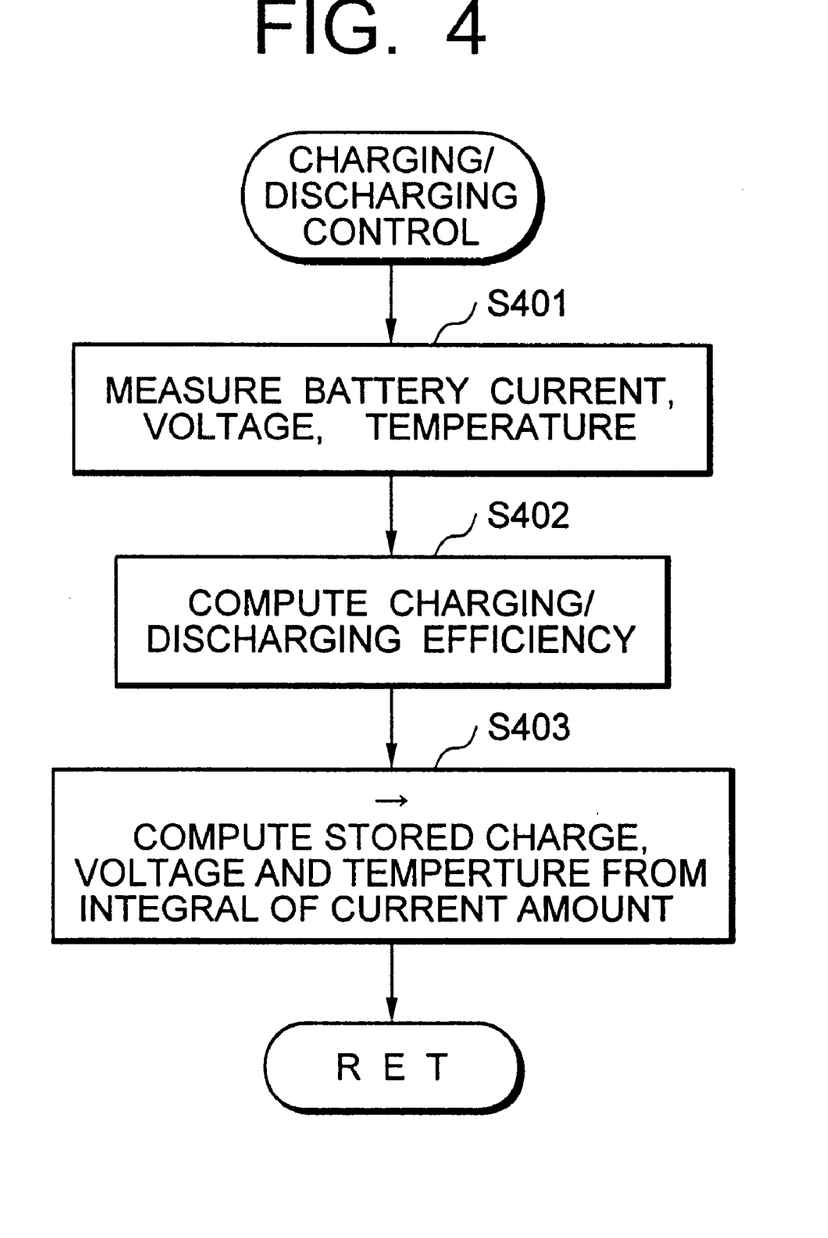
FIG. 4 is a flowchart for explaining the operation of a measuring section in the measuring device shown in FIG. 3.

The operation of the measuring section 50a in the measuring device 50 for outputting battery charging/discharging control and stop commands, and battery charging/discharging control maximum current values will be described with reference to the flowchart shown in FIG. 4.

First, the charging/discharging current, the charging/discharging voltage, and the temperature of the power accumulator 21 are measured (step S401). A charging/discharging efficiency is obtained from the measured values (step S402).

If the current is I and the temperature is T, and if a charging/discharging efficiency $\eta$ can be determined from these two parameters, then charging/discharging efficiency $\eta$ is expressed by a function: $\eta = f_1(I) + f_2(T)$. For example, with respect to the current, $K_1 I + K_2$ (where each of $K_1$ and $K_2$ is a constant) may be set as function $f_1(I)$ according to the performance of the battery, since the efficiency is lowered as the charging/discharging current is increased. In the actual battery, the efficiency also changes depending on the amount of stored charge at the time of a start of charging, the number of times charging/discharging is repeated, or the like. Therefore, a function of such a variable may be set to achieve a finer setting of the charging/discharging efficiency.

Then, the battery current obtained by multiplying together the current and the efficiency obtained in steps S401 and S402, and the amount of charge stored in the battery, the amount of changed voltage and the changed temperature obtained from the integral of the battery current are computed (step S403).

Figure 5:
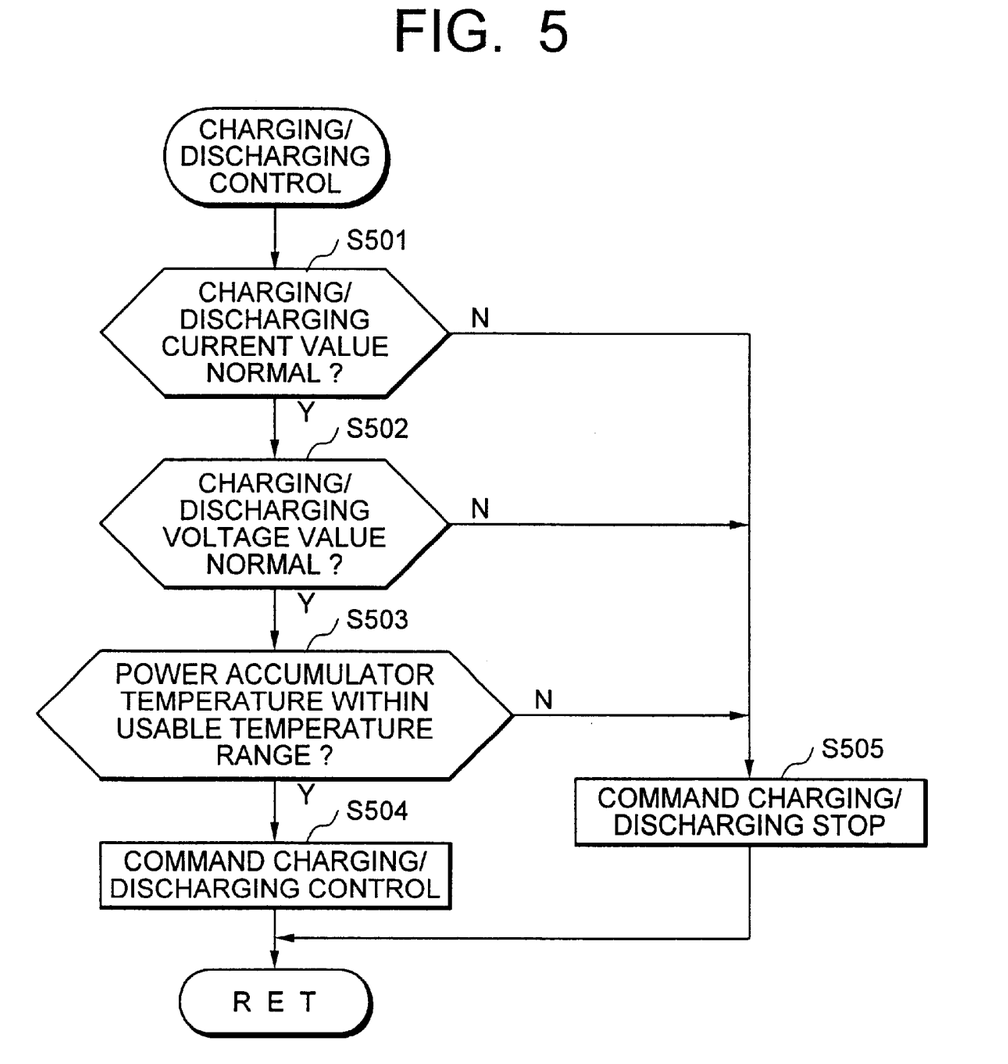
FIG. 5 is a flowchart for explaining the operation of a battery abnormality detection section in the measuring device shown in FIG. 3.

The operation of the battery abnormality detection section 50b in the measuring device 50 will next be described with reference to the flowchart shown in FIG. 5.

Ordinarily, a current and a voltage at which the battery can be charged or discharged is determined from the battery performance. Therefore, a determination is made as to whether or not the charging/discharging current value and the charging/discharging voltage value in the battery are normal (steps S501, S502). If an abnormality is detected, the charging/discharging controller is stopped to inhibit charging/discharging of the battery (step S505).

Ordinarily, the temperature range in which a secondary battery is usable is limited. For example, ordinary nickel metal hydride batteries have a usable temperature range of 0 to 55° C., although the temperature range may vary with respect to the size of the current. Therefore, when the temperature of the power accumulator 21 is within the usable temperature range, charging/discharging control is performed under ordinary conditions (steps S503 to S504). When the temperature is out of the range, charging/discharging of the power accumulator 21 is stopped (steps S503 to S505).

Figure 6:
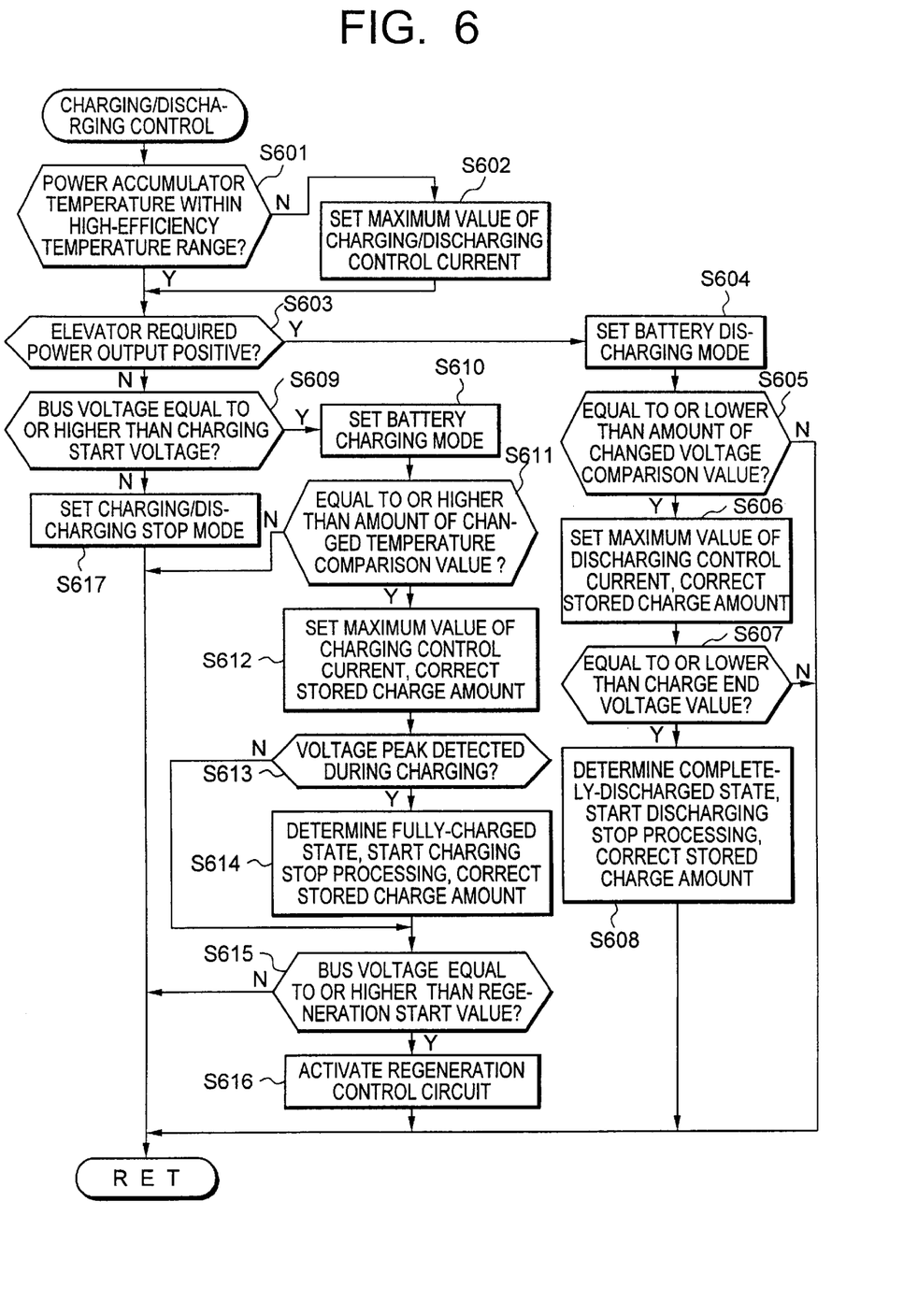
FIG. 6 is a flowchart for explaining the operation of a current limit value determination section in the measuring device shown in FIG. 3.

The operation of the current limit value determination section 50c in the measuring device 50 will next be described with reference to the flowchart shown in FIG. 6.

Ordinary nickel metal hydride batteries can be used at a substantially high operating efficiency in the temperature range of 10 to 40° C. and have a usable temperature range of 0 to 55° C., although the temperature range may vary with respect to the size of the current.

Therefore, when the temperature of the power accumulator 21 is within the temperature range of, for example, 10 to 40° C., charging/discharging control is performed under ordinary conditions. When the temperature is in the range of 0 to 10° C. or in the range of 40 to 55° C., the charging/discharging current maximum value is limited. When the temperature range is 0° C. or lower or 55° C. or higher, charging/discharging of the power accumulator 21 is stopped. In this manner, the battery can be used under moderate conditions.

That is, a determination is made as to whether the temperature of power accumulator 21 is within the high-efficiency temperature range (the range of 10 to 40° C.). If the temperature is out of this range (in the range of 0 to 10° C. or in the range of 40 to 55° C.), a maximum value of the charging/discharging control current is set to limit the charging/discharging current (steps S601, S602). If the temperature of the power accumulator 21 is within the high-efficiency temperature range, a determination is made as to whether or not the output from the required power computation circuit 24 is positive (step S603). If it is positive, a battery discharging mode is set (step S604) in which discharging from the power accumulator 21 is performed.

In this battery discharging mode, the above-described method for grasping the battery charge amount enables ascertainment, from the computed battery charge amount and amount of changed voltage and the current value, as to whether the amount of charge stored in the power accumulator 21 is close to the value corresponding to the completely-discharged state, for example, whether the stored charge amount is about 20% of the fully-charged amount. Therefore, a determination is made as to whether or not the amount of changed voltage is equal to or smaller than a comparison value (step S605). If the changed voltage is equal to or smaller than the comparison value, measures are taken to change the discharging condition by considering the reduction in discharging efficiency and to prevent overdischarging of the power accumulator 21 by considering safety. That is, a maximum value of the discharging control current is set and the stored charge amount is corrected, thereby limiting and reducing the discharging current (step S606).

The power supply from the battery is thereby reduced, but the necessary power for the elevator is supplied from the utility power supply 1 through the converter 11. If the stored charge amount is grasped as described above, the discharging current command value is limited to reduce the discharging current from the battery.

Similarly, the above-described method for grasping the battery charge amount enables ascertainment of the completely-discharged state of the battery based on checking the battery current value and the reduction of voltage value to a certain voltage during discharging. Therefore, a determination is made as to whether or not the voltage value has become equal to or smaller than the discharge end voltage (step S607). If the result is that the voltage value is equal to or smaller than the discharge end voltage, it is determined that the battery is completely discharged, discharging stop processing is performed and the stored charge amount is corrected, thus preventing overdischarging of the battery (step S608).

If it is determined in step S603 that the output from the required power computation circuit 24 is not positive, and if the bus voltage is higher than a predetermined charging start voltage, a battery charging mode is set in which the power accumulator 21 is charged (steps S603, S609, S610).

In this battery charging mode, the above-described method for grasping the battery charge amount enables ascertainment, from the computed battery charge amount and the amount of changed battery temperature and the current value, as to whether the amount of charge stored in the power accumulator 21 is close to the value corresponding to the fully-charged state, for example, whether the stored charge amount is about 90% of the fully-charged amount. Therefore, a determination is made as to whether or not the changed amount of the battery temperature is equal to or larger than a comparison value (step S611). If the changed amount of the battery temperature is equal to or larger than the comparison value, the charging condition is changed by considering the reduction in the charging efficiency. That is, the maximum value of the charging control current is limited and the stored charged amount is corrected, thereby reducing the charging current (step S612).

The charging current is thus limited and the battery is not charged with all of the regenerated power. When the power is not fully used for charging, the voltage of the dc bus 9 becomes higher. Once the voltage of the dc bus 9 becomes higher than the regeneration start value, the regeneration resistance control circuit 17 shown in FIG. 1 is activated even if no voltage peak is detected. Regenerated power is thereby consumed by development of heat in the regeneration resistor 16 (steps S613→S615, S616).

If the stored charge amount is grasped as described above, the charging current command value is limited to reduce the charging current to the battery.

Similarly, the above-described method for grasping the battery charge amount enables ascertainment of the fully-charged state of the battery based on checking the battery current value and whether the rising voltage value has a peak and starts falling during discharging. On ascertaining the fully-charged state, charging stop processing is performed and the stored charge amount is corrected. If the voltage of the dc bus 9 becomes equal to or higher than the regeneration start value, the regeneration resistance control circuit 17 shown in FIG. 1 is activated to cause regenerated power to be consumed by development of heat in the regeneration resistor 16, thereby preventing overcharging of the battery (steps S613 to S616).

If in step S609 the bus voltage is lower than the charging start voltage, a charging/discharging stop mode is set in which charging/discharging is stopped (step S617).

In Embodiment 1 of the present invention, as described above, the conditions of the power accumulator are measured, each of charging and discharging of regenerated power is controlled according to data on the measured conditions. That is, to ensure an energy-saving effect, charging and discharging are controlled so that the power accumulator accepts regenerated power as much as possible at the time of charging, and discharges a possible amount of power at the time of discharging from the accumulation. However, for the purpose of maintaining the desired charging performance and life of the battery, the power accumulator is prevented from being excessively charged and from being excessively discharged. Thus, it is possible to provide an elevator controller arranged to achieve a high energy-saving effect based on charging while using a low-capacity and low-priced secondary battery.

Embodiment 2

A method of setting a current limit value at the time of charging or discharging in Embodiment 2 of the present invention will next be described.

The method will be described with respect to the same configuration of Embodiment 1 as shown in FIGS. 1 and 2.

High-rate charging or discharging of a generally-used secondary battery in a state close to a fully-charged state or a completely-discharged state entails a risk of overcharging or overdischarging. Therefore, it is desirable that the measuring device 50 should prevent fully-charging or completely discharging of the battery, and enables safer use of the battery by grasping the stored charge amount and limiting the charging/discharging current to or from the battery before the battery is fully charged or completely discharged.

Ordinary secondary batteries have battery specification values or battery rated values, such as maximum charging and discharging values, rated charging and discharging values, and C (a unit used to indicate the magnitude of charging/discharging current, formed of a multiple of a value indicating a rated battery capacity, and expressed in a current unit). For example, a charging/discharging current limit value may be selected according to the battery charge amount to be set to a maximum charging/discharging value with respect to an ordinary charge amount, and to a rated charging value with respect to a charge amount close to the charge amount corresponding to the fully-charged or completely-discharged state, or to, for example, the product of a constant and each of these values, the product being selected by considering a safety factor. By using such a charging/discharging current limit value, an efficient elevator operation using a more efficient battery can be performed without overcharging or overdischarging the battery.

The charging/discharging current limit value may be set in a stepping manner according to the stored charge amount output from the measuring device 50 or may be set by referring to a table containing its variations together with battery temperatures, thereby achieving finer control and enabling an efficient elevator operation using the battery.

The charging current value limit circuit 51 and the discharging current value limit circuit 52 in the charging and discharging control circuit 23A shown in FIG. 2 will be described below.

The charging current value limit circuit 51 and the discharging current value limit circuit 52 are added to the circuit blocks of the charging and discharging control circuit 23A to enable adjustment of charging and discharging current maximum values. The maximum value of the discharging current is limited according to the output from the measuring device 50, thereby reducing the discharging current.

In this case, the discharging current command, computed from the required power signal output from the required power computation circuit 24 and from the utility voltage value and the battery voltage set in advance, is limited by the discharge current value limit circuit 52. Also, the maximum value of the charging current is limited by the charging current value limit circuit 51 according to the output from the measuring device 50, thereby reducing the charging current. In this case, the charging current command computed from the output from the voltage controller 31 and the current feedback signal is limited.

Embodiment 3

The operation of the charging and discharging control circuit 23A in Embodiment 3 of the present invention will be described.

The maximum speed and the maximum carrying capacity of the elevator are determined independently of the specifications of the elevator controller, and the maximum (peak) power pattern of the elevator is thereby determined. The amount of electric power to be supplied from the battery depends on the specifications of the elevator. For example, the maximum charging/discharging current to or from the battery is set to the peak value of the required power. If the maximum charging/discharging current value or namely the peak value of the required power is Ia, and if the current limit value output from the measuring device 50 is Ib, the charging and discharging control circuit 23A multiplies the current command value by a constant Ib/Ia. Alternatively, the charging and discharging control circuit 23A operates so that any value of the current command value equal to or larger than Ib is set to Ib.

Thus, the maximum of any value of the current command does not exceed the current limit value, and the charging/discharging current to or from the battery is limited by the current command value.

According to the present invention, as described above, the conditions of the power accumulator are measured and each of charging and discharging of regenerated power is controlled on the basis of data obtained by the measurement, thus performing charging/discharging control enabling extension of the battery life. An elevator controller arranged to perform this control can be provided as an elevator controller having a high energy-saving effect based on charging while using a low-capacity and low-priced secondary battery.

What is claimed is:

1. An apparatus for controlling an elevator, comprising:
   a converter for converting an alternating current from an alternating current power supply into direct current power by rectifying the alternating current;
   an inverter for driving an electric motor by converting the direct current power from said converter into variable-voltage variable-frequency alternating current power, the electric motor driving an elevator;
   a direct current bus connecting said converter to said inverter;
   a power accumulator connected to said direct current bus, said power accumulator accumulating direct current power from said direct current bus during regenerative operation of the elevator, and supplying accumulated direct current power to said direct current bus during operation of the elevator;
   measuring means for measuring charging current flowing into and discharging current flowing out of said power accumulator and at least one of temperature and voltage of said power accumulator; and
   charge/discharge control means for controlling charging and discharging of said power accumulator and adjusting maximum charging and discharging current of said power accumulator in response to the charging and discharging current and at least one of the temperature and voltage measured by said measuring means, whereby excessive charging and discharging of said power accumulator are prevented.

2. The apparatus for controlling an elevator according to claim 1, wherein said measuring means measures charging current and discharging current and at least one of voltage and temperature of said power accumulator during charging and discharging.

3. The apparatus for controlling an elevator according to claim 1, wherein a state of charge of said power accumulator is determined from the output from said measuring means before said power accumulator is overcharged or overdischarged.

4. An apparatus for controlling an elevator, comprising:
   a converter for converting an alternating current from an alternating current power supply into direct current power by rectifying the alternating current;
   an inverter for driving an electric motor by converting the direct current power from said converter into variable-voltage variable-frequency alternating current power, the electric motor driving an elevator;
   a direct current bus connecting said converter to said inverter;
   a power accumulator connected to said direct current bus, said power accumulator accumulating direct current power from said direct current bus during regenerative operation of the elevator, and supplying accumulated direct current power to said direct current bus during operation of the elevator;
   measuring means for measuring at least one of temperature, current, and voltage of said power accumulator; and
   charge/discharge control means for controlling charging and discharging of said power accumulator from or to the direct current bus and adjusting maximum charging and discharging current of said power accumulator according to an output from said measuring means, wherein a fully-charged state and a completely-discharged state of said power accumulator are determined from at least one output of said measuring means.

5. An apparatus for controlling an elevator, comprising:
   a converter for converting an alternating current from an alternating current power supply into direct current power by rectifying the alternating current;
   an inverter for driving an electric motor by converting the direct current power from said converter into variable-voltage variable-frequency alternating current power, the electric motor driving an elevator;
   a direct current bus connecting said converter to said inverter;
   a power accumulator connected to said direct current bus, said power accumulator accumulating direct current power from said direct current bus during regenerative operation of the elevator, and supplying accumulated direct current power to said direct current bus during operation of the elevator;
   measuring means for measuring at least one of temperature, current, and voltage of said power accumulator; and charge/discharge control means for controlling charging and discharging of said power accumulator from or to the direct current bus and adjusting maximum charging and discharging current of said power accumulator according to an output from said measuring means, said charge/discharge control means including, for adjusting the maximum charging and discharging current, a current limit circuit limiting a charging/discharging current command value to a charging/discharging current limit value in response to at least one output from said measuring means.

6. The apparatus for controlling an elevator according to claim 5, wherein said current value limit circuit multiplies the charging/discharging current command value by a constant such that the maximum charging and discharging current from elevator operation is limited to the charging/discharging current limit.

7. The apparatus for controlling an elevator according to claim 5, wherein said current value limit circuit limits the charging/discharging current command value to the charging/discharging current limit value when the charging/discharging current command value exceeds the current limit value.

8. The apparatus for controlling an elevator according to claim 5, wherein said current value limit circuit sets the charging/discharging current limit value to a value obtained as the product of a constant and one of a battery specification value and a battery rated value of said power accumulator.

* * * * *